United States Patent Office 2,759,023
Patented Aug. 14, 1956

2,759,023

PROCESS OF MANUFACTURING POLYHYDRIC ALCOHOLS BY CATALYTIC REDUCTION OF CARBOHYDRATES

Cornelis Martinus Hendrik Kool, Jan Lolkema, and Geert Moes, Hoogezand, Netherlands, assignors to Naamlooze Vennootschap W. A. Scholten's Chemische Fabrieken, Groningen, Netherlands, a corporation of the Netherlands No Drawing. Application November 3, 1952, Serial No. 318,535

5 Claims. (Cl. 260—635)

The invention has for its object the manufacture of polyhydric alcohols by catalytic hydrogenation of carbohydrates containing small quantities of impurities which retard said catalytic reduction. Carbohydrates which may be converted into polyhydric alcohol are e. g. starch and starch hydrolysis products, such as thin boiling starches, dextrins, crude starch sugars or glucose syrups, and mono-, di- and polysaccharides, such as arabinose, fructose, galactose, maltose, lactose, saccharose, raffinose or inulin. When using di- or polysaccharides or mixtures containing the same as a starting material they are first hydrolyzed to monosaccharides, which are subsequently reduced to polyhydric alcohols, the hydrolysis and the hydrogenation being preferably effected in the same operation. The reduction products may be either polyhydric alcohols with the same number of carbon atoms as the monosaccharides, e. g. sorbitol, or polyhydric alcohols with a smaller number of carbon atoms, e. g. glycerol and propylene glycol.

The catalytic reduction of aqueous solutions or suspensions of carbohydrates to polyhydric alcohols is well known in the art. It has appeared, however, that in many cases reduction does not proceed satisfactorily.

According to the invention such carbohydrate materials, containing small quantities of impurities which retard or impede the catalytic reduction to polyhydric alcohols, can be easily and completely converted into polyhydric alcohols, if said starting materials, prior to the catalytic reduction, are treated in aqueous dispersion with a small proportion of hydrogen peroxide or a derivative thereof. The derivatives of hydrogen peroxide to be used according to the invention may be inorganic as well as organic per compounds, such as sodium peroxide, barium peroxide, percarbonates, persulphates, perborates, perphosphates, sulfomonoperacid $H_2SO_5$, peracetic acid, perbenzoic acid, benzoyl peroxide, alkyl peroxides, ozone and ozonides.

As hydrogen peroxide and its derivatives are active oxygen compounds, which are all characterized by the presence of the group —O—O— in the molecule, the favourable influence of hydrogen peroxide and its derivatives probably has to be attributed to an oxidation of the impurities of the carbohydrate, whereby these impurities are destroyed and/or converted into other compounds which no more retard or impede the catalytic reduction of the carbohydrate to a polyhydric alcohol.

A valuable and very sensitive method for establishing traces of sulphur dioxide and/or of sulphites in carbohydrates, such as starch and starch hydrolysis products, is that described by Rothenfusser in Zeitschrift für Untersuchung der Lebensmittel, volume 58 (1929), pages 98–109. According to this method the sulphur dioxide present in the product to be analyzed as such or in the form of sulphite is distilled and transferred to an alcoholic solution of benzidine containing hydrogen peroxide. The sulphur dioxide is oxidized to sulphuric acid which forms the insoluble benzidine sulphate.

With this method it is easy to detect the presence of amounts of sulphur dioxide as low as 0.5–1 mg.

We have found that the hydrogenation of starch and starch hydrolysis products, containing sulphur in the form of sulphur dioxide and/or of sulphites, to sorbitol will proceed smoothly and completely when said carbohydrates are treated previously in aqueous suspension or solution with such a proportion of an oxidizing agent, e. g. hydrogen peroxide, that at least 200 grams of the treated carbohydrate gives a negative reaction on sulphur dioxide with said method of Rothenfusser.

The proportion of the oxidising agent with which the carbohydrate material, such as starch and starch hydrolysis products, prior to the hydrogenating step, have to be treated in order to be converted rapidly and completely into sorbitol, generally amounts to only a few tenths of a percent to a few percents of the weight of the carbohydrate. More specifically the proportion of the oxidising agent varies from about 0.001% to about 5% by weight, based on the weight of the carbohydrate. According to the preferred embodiment of the invention hydrogen peroxide is used as the oxidising agent and in most cases the desired effect can be obtained with less than one percent of this oxidising agent, calculated on the weight of the carbohydrate. More specifically the proportion of hydrogen peroxide required varies from about 0.001% to about 1% by weight, based on the weight of the carbohydrate.

The treatment of the carbohydrate with the oxidising agent may be effected at room temperature or at elevated temperatures, e. g. 100° C. With a view to a possible attack of the hydrogenating catalyst, however, it is desirable to decompose or to remove an excess of the oxidising agent used before subjecting the carbohydrate to the hydrogenating process. If the carbohydrate to be hydrogenated, such as e. g. starch or a high polymeric hydrolysis product of starch, is previously hydrolyzed, the oxidising treatment and the hydrolysis of the polysaccharide may be accomplished simultaneously.

Suitable starting materials for the present process are all carbohydrates which by hydrogenation or by hydrogenolysis (combined hydrolysis and hydrogenation) may be converted into polyhydric alcohols. The invention, however, is particularly valuable for the manufacture of sorbitol or a mixture of isomeric hexitols from starch and starch hydrolysis products. The term "starch hydrolysis products" as used throughout the specification and appended claims includes glucose, high polymeric hydrolysis products of starch, such as thin boiling starches and dextrins, and mixtures of glucose and polymers of glucose, obtained by the conversion of starch with acids and/or enzymes. Examples of such mixtures are glucose syrups, maltose syrups and crude starch sugars, such as e. g. 70° and 80° corn sugar, which consist of mixtures of glucose, maltose and dextrin and, contingently minor quantities of slightly converted or non-converted starch.

The reduction is carried out with hydrogen or hydrogen containing gases in the presence of a catalyst, said catalyst being usually nickel, copper, cobalt, oxides of said metals or mixtures of two or more of said metals and oxides. They are used in finely divided condition and preferably on a carrier, such as diatomaceous earth. For activating the catalyst certain difficultly reducible oxides, such as chromium, aluminium, or tungsten oxides, may be incorporated into the same.

It is advantageous to use catalysts which are substantially free from alkaline substances as described in U. S. Patent 2.609,398.

When using starting materials consisting of or containing a substantial proportion of polysaccharides, which are to be hydrolyzed to monosaccharides as a first step in the hydrolytic hydrogenation it is advantageous to add a latent acid generating substance which at ordinary temperature presents a neutral reaction, but at the temperature of the hydrolytic hydrogenation in the presence of water will hydrolyze to substances having an acid reaction, as described in U. S. Patent 2,609,399.

When the present process is used for the manufacture of lower polyhydric alcohols, such as glycerol, propylene glycol or mixtures thereof, by destructive hydrogenation of carbohydrates, the hydrogenation temperature should be above 200° C., preferably 250–300° C. The invention, however, is of particular importance for the production of sorbitol and isomeric hexitols, which is carried out at lower temperatures. For the reduction of monosaccharides, more particularly glucose, the temperature generally should not be above 160° C., whereas for the hydrolytic hydrogenation of polysaccharides, such as starch and dextrin, temperatures up to 200° C. are more advantageous. The reduction of glucose starts at approximately 100° C. and will proceed quickly at temperatures of 120–160° C., without any noticeable formation of caramel. The most favourable temperature for the reduction of starch and high polymeric hydrolysis products of starch to sorbitol is from about 180° to about 200° C. For the reduction of starting materials consisting of mixtures of glucose and polymers of glucose, such as glucose syrups and crude starch sugars, to sorbitol we, therefore, preferably use the process described in U. S. Patent 2,546,103 according to which the material is first hydrogenated at a temperature not exceeding 160° C. until at least the bulk of the glucose is reduced, and thereafter converting the polymers of glucose into sorbitol by continuing the hydrogenating treatment at a temperature above 180° C., but not so high as to effect splitting of the carbon-carbon bond, and stopping the hydrogenating treatment when said polymers of glucose have been reduced to sorbitol. The hydrogenating treatment is generally carried out at an elevated pressure, e. g. 20–200 atm.

The results obtained by the process according to the invention will appear from some comparative experiments described below. The experiments have been carried out in an autoclave of stainless steel provided with a high speed agitator (about 500 R. P. M.) and electrical heating means.

*Example 1*

The nickel catalyst used in this example was obtained by dissolving 495 g. of crystalline nickel sulfate ($NiSO_4 7H_2O$) in 15 litres of water, adding 400 g. of purified diatomaceous earth, subsequently adding 6680 g. of a 5% ammonium bicarbonate solution at 40° C., while stirring, continuing the agitation of the liquid for about 1½ hours at the same temperature, allowing the precipitate to settle, decanting the clear liquid, boiling the precipitate with 15 litres of water, centrifuging the precipitate and rinsing the same with hot water until the filtrate was free of sulfate, drying the material at 110° C. and reducing the same in a current of hydrogen at 525° C.

The carbohydrate material used was a 70° corn sugar with a moisture content of 14.5% and a dextrose equivalent of 82.0% calculated on the dry substance. To a solution of 100 g. of this corn sugar in 100 g. of water 0.3 cc. of a 30% hydrogen peroxide solution was added and the mixture was heated to the boiling point for 15 minutes so as to oxidize the impurities, the excess of hydrogen peroxide being decomposed at the same time. The solution was then cooled to room temperature and sufficient water was added to compensate for the loss by evaporation. The solution was admixed with 10 g. of the catalyst described above and phosphoric acid was added so as to bring the pH value to 3.5. The mixture was introduced into the autoclave which was then connected with a hydrogen container so as to establish a hydrogen pressure of about 100 atm. The mixture was heated for 1½ hours to a temperature of 140° C., which is sufficient to reduce the bulk of the glucose present. Thereafter the temperature was raised in about 1 hour from 140° C. to 200° C. and the mixture was maintained for 1½ hours at this temperature in order to reduce the polysaccharides present in the starting material. The autoclave was then cooled to about room temperature. After blowing off the excess of hydrogen the autoclave was opened and the hydrogenated solution was separated from the catalyst by filtration. The filtered solution contained 0.1% of glucose, 0.1% of dextrin and 99.0% of sorbitol, calculated on dry material.

This experiment was repeated with the same starting material in the same way, however omitting the oxidizing step. It appeared that in this case the final solution contained 12.7% of glucose, while the dextrin and sorbitol could not be exactly determined on account of the high percentage of glucose. It appeared that the 70° corn sugar used as the starting material for the above experiments contained 0.02% of sulfur dioxide, determined by iodometric titration with a 0.02 N iodine solution, whereas after the oxidizing treatment no sulfur dioxide could be established by this method. The Rothenfusser test with 200 grams of the treated carbohydrate was entirely negative.

*Example 2*

The catalyst used in this example was prepared in the following way:

3.0 kg. of $NiSO_4 7H_2O$ of commercial quality is dissolved in 90 litres of water and 2.5 kg. of diatomaceous earth is added. Then 15.5 litres of 5% NaOH solution are stirred into this mixture at 40° C. in the course of 15 minutes, stirring being continued for 30 minutes. The mixture is filtered on large Büchner filters, the catalyst suspended again in water of 80° C., filtered, rinsed with water etc. until the filtrate contains only traces of sulfate. The catalyst is dried at 100° C. in a vacuum oven and finely ground. The ground catalyst is reduced in a stream of hydrogen for 3 hours at 525° C.

To a solution of 100 grams of a 70° corn sugar with a moisture content of 14.5% and a dextrose equivalent of 90.7%, calculated on the dry substance, in 95 cc. of water were added 5 cc. of a solution of hydrogen peroxide of 3% strength. The mixture was boiled for ten minutes and then cooled to room temperature, after which water was added until the weight of the solution was again 200 grams. To the solution thus treated 10 grams of the catalyst described above and 1.4 grams of $NiSO_4.7H_2O$ were added.

This mixture was heated in the autoclave to a temperature of 140–150° C. for one hour in the presence of hydrogen under a pressure of about 125 atmospheres. In order to convert the polymers of glucose into sorbitol the temperature of the mixture to be hydrogenated was then raised in the course of 1 hour to about 200° C., this temperature being maintained for 1¼ hours. After cooling to room temperature the liquid was filtered and then analyzed. The reaction product consisted of pure sorbitol, which contained only traces of glucose and dextrin.

When subjecting the aqueous solution of the corn sugar to the hydrolytic hydrogenation without previously treating the same with hydrogen peroxide but otherwise under similar conditions, a final product resulted which contained 8.7% of glucose, 3.4% of dextrin nad only 73% of sorbitol.

By gravimetric determination the percentage of sulfur dioxide in the 70° corn sugar was found to be 0.037%. After treating the sugar with hydrogen peroxide in the way indicated in example 2, however, the test of Rothenfusser was completely negative with 300 grams of the treated sugar.

*Example 3*

A mixture of 125 grams of commercial potato starch and 125 cc. of water was heated in the presence of 0.8 gram of sulfuric acid in an autoclave of stainless steel provided with an agitator for 45 minutes at a temperature of 140° C. After cooling to room temperature the pH of the solution thus obtained was adjusted with nickel carbonate to 4.2, whereafter 12.5 grams of the nickel catalyst of example 2 were added.

This mixture was heated in the autoclave to a temperature of 140–160° C. for 1 hour under a hydrogen pressure of about 100 atm. In order to convert the polymers of glucose into sorbitol the temperature of the mixture was then raised in the course of 1 hour to about 200° C. and maintained at this level for 1 hour.

After cooling to room temperature the liquid was filtered. The solution possessed the smell of caramelization products and reduced a Fehling solution in the cold. The percentage of reducing sugars, expressed as glucose, was 13.1%, calculated on the dry material. As a consequence of this high percentage of reducing sugars the sorbitol content of the solution could not be determined.

The experiment was repeated with the difference that the mixture of 125 grams of potato starch and 125 cc. of water was heated, prior to the hydrogenolysis step, in the presence of 0.8 grams of sulphuric acid and 1 cc. of hydrogen peroxide of 30 percent strength. In this case a product was obtained which consisted of 98% of sorbitol, 0.7% of glucose and 0.2% of dextrin.

The commercial potato starch used in this example contained traces of bisulfites and sulfites, which originate from the manufacturing process of the starch. When subjecting 10 grams of the starch to the test of Rothenfusser a positive reaction on sulfur dioxide was observed. After the oxidizing treatment the reaction was negative.

*Example 4*

100 grams of glucose syrup with a moisture content of 18.5% and a dextrose equivalent of 49.6%, calculated on the dry substance, were diluted with 100 cc. of water and then 1 cc. of a 3% solution of hydrogen peroxide was added. The solution was heated to boiling temperature for 10 minutes and after cooling to room temperature water was added until the weight of the solution was 200 grams.

To the solution of glucose syrup thus treated 10 grams of the nickel catalyst of example 1 were added, whereafter the pH of the mixture was adjusted to 3.5 with phosphoric acid. The mixture was heated in the autoclave to a temperature of 140–150° C. for 1½ hours under a hydrogen pressure of about 100 atmospheres. In order to convert the polymers of glucose into sorbitol the temperature of the liquid was then raised in the course of 1 hour to about 200° C., at which level the temperature was maintained for 75 minutes. After cooling to room temperature the solution was filtered in order to remove the catalyst and subsequently analyzed. The final product contained 0.15% of dextrose, 0.18% of dextrin and 98.9% of sorbitol, calculated on the dry material.

When hydrogenating a solution of 100 grams of the glucose syrup in 100 cc. of water, which had not been previously treated with hydrogen peroxide, but under otherwise the same conditions, a final product was obtained which contained 4.1% of dextrose, 0.7% of dextrin and only 84.1% of sorbitol, calculated on the dry material.

When subjecting 200 grams of the glucose syrup, used in this example, to the test of Rothenfusser a positive reaction on sulfur dioxide was observed, whereas by iodometric titration with 0.02 N iodine solution a sulfur dioxide percentage of 0.003%, calculated on the glucose syrup, was found. After the treatment with hydrogen peroxide, however, the test of Rothenfusser with 500 grams of the treated syrup was completely negative.

We claim:

1. A process for the catalytic hydrogenation of carbohydrates selected from the group consisting of starch and starch hydrolysis products to polyhydric alcohols, said carbohydrates being contaminated with a small proportion of a sulfur compound from the class consisting of sulfurous acid and salts thereof, which comprises treating an aqueous dispersion of said carbohydrate, prior to the catalytic hydrogenation thereof to polyhydric alcohol, with from about 0.001% to about 5%, based on the weight of the carbohydrate, of hydrogen peroxide.

2. A process for the catalytic hydrogenation of carbohydrates selected from the group consisting of starch and starch hydrolysis products to polyhydric alcohols substantially consisting of sorbitol, said carbohydrates being contaminated with a small proportion of a sulfur compound from the class consisting of sulfurous acid and salts thereof, which comprises treating an aqueous dispersion of said carbohydrate, prior to the catalytic hydrogenation thereof to polyhydric alcohol, with from about 0.001% to about 5%, based on the weight of the carbohydrate, of hydrogen peroxide.

3. A process as described in claim 1 in which the proportion of hydrogen peroxide is such that at least 200 grams of the carbohydrate after said oxidizing treatment gives a negative sulfur dioxide reaction by the Rothenfusser test.

4. A process for the catalytic hydrogenation of a mixture of glucose and polymers of glucose obtained by the hydrolysis of starch to polyhydric alcohols substantially consisting of sorbitol, said mixture being contaminated with a small proportion of a sulfur compound from the class consisting of sulfurous acid and salts thereof, which comprises first treating said mixture in aqueous solution with from about 0.001% to about 5%, based on the weight of said mixture, of hydrogen peroxide, adding a hydrogenating catalyst and heating the mixture with water in the presence of hydrogen at superatmospheric pressure to a temperature of 120–160° C., until at least the bulk of the glucose is hydrogenated, and thereafter converting the polymers of glycose into sorbitol by continuing the hydrogenating treatment at a temperature above 180° C., but not so high as to effect splitting of the carbon-carbon bond, and stopping the hydrogenating treatment when said polymers of glucose have been hydrogenated to sorbitol.

5. A process for the catalytic hydrogenation of polysaccharides selected from the group consisting of starch, thin boiling starch and dextrin to polyhydric alcohols substantially consisting of sorbitol, said polysaccharides being contaminated with a small proportion of a sulfur compound from the class consisting of sulfurous acid and salts thereof, which comprises first treating said polysaccharide in aqueous dispersion with from about 0.001% to about 5%, based on the weight of said polysaccharide, of hydrogen peroxide and thereafter adding a hydrogenating catalyst and heating said polysaccharide in admixture with water in the presence of hydrogen at superatmospheric pressure to a temperature above 180° C., but not so high as to effect splitting of the carbon-carbon bond.

References Cited in the file of this patent

UNITED STATES PATENTS

| | | |
|---|---|---|
| 2,082,425 | Scheller | June 1, 1937 |
| 2,082,656 | Reichert et al. | June 1, 1937 |
| 2,282,603 | DuPuis | May 12, 1942 |
| 2,334,126 | Reichert et al. | Nov. 9, 1943 |
| 2,433,661 | Hampel | Dec. 30, 1947 |
| 2,585,816 | Mertzweiller | Feb. 12, 1952 |
| 2,609,398 | Lolkema et al. | Sept. 2, 1952 |

OTHER REFERENCES

Groggins: Unit Processes in Organic Chemistry (4th Edit.), 1952, McGraw Hill; pp. 526 and 527 (3rd Edit.), 1947, same pp.